March 19, 1963  W. T. BROMLEY  3,081,990
GAS CUTTING MACHINE

Filed March 10, 1961

INVENTOR.
Walter T. Bromley
BY
Harness, Dickey & Pierce
ATTORNEYS

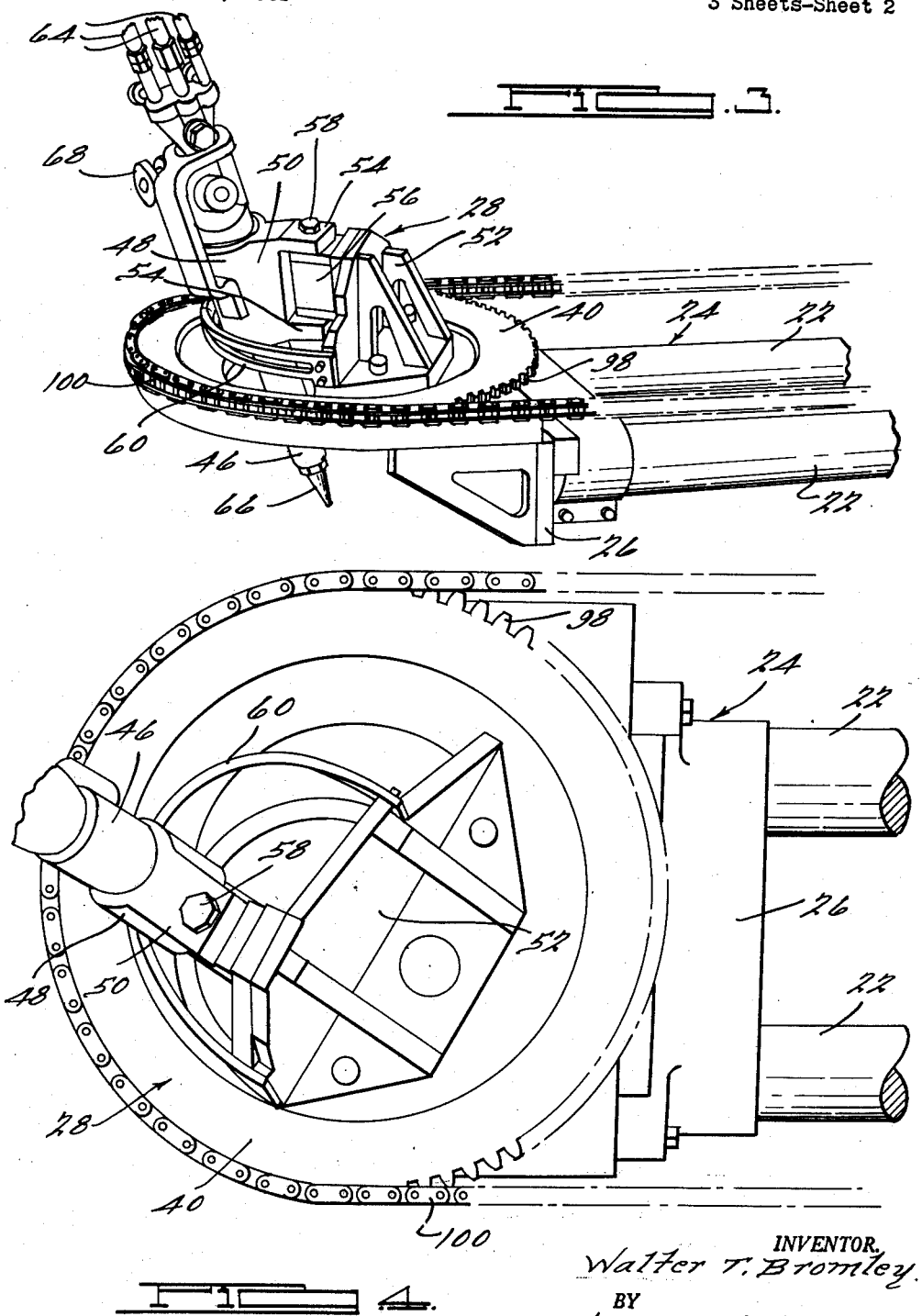

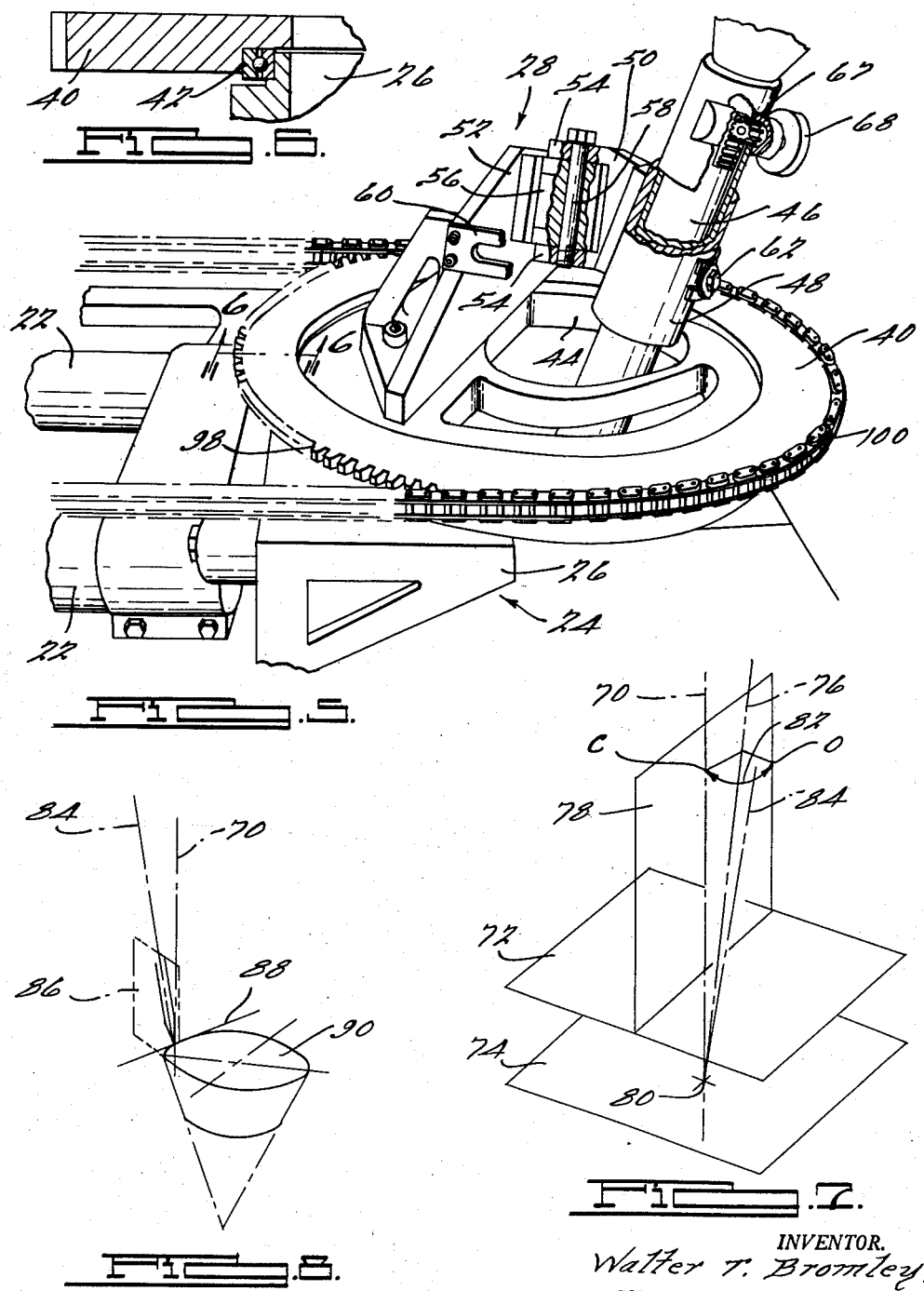

United States Patent Office 3,081,990
Patented Mar. 19, 1963

3,081,990
GAS CUTTING MACHINE
Walter T. Bromley, Bloomfield Hills, Mich., assignor of one-half to Donald A. Fagan, Warren, Mich.
Filed Mar. 10, 1961, Ser. No. 94,836
7 Claims. (Cl. 266—23)

The present invention broadly pertains to pantograph type tracing machines employing one or more cutting torches thereon, and more particularly to an improved torch mounting assembly which provides for angular adjustment of the nozzle axis of the torch relative to the plane of the workpiece being cut and concurrently enables rotary movement of the torch in order that workpieces can be cut having a substantially constant draft angle or bevel along the entire edge of the workpiece.

Cutting machines of the general type to which the present invention is applicable employ a pantograph mechanism for controlling the travel of a cutting torch mounted thereon in guided response to a tracing device which is adapted to accurately follow the outline of a template or pattern of the workpiece. In cutting machines of this general type, the cutting torch is conventionally held in a fixed position on the supporting bar of the pantograph mechanism throughout the cutting operation so that the resultant cut is substantially perpendicular to or at a constant angle to the plane of the material from which the workpiece is cut. In torch mounting assemblies heretofore known some provision is generally provided for manually adjusting the angle of the torch with respect to the plane of the material to be cut. However, these torch mounting assemblies do not enable the angular direction of the torch to be changed with respect to the supporting bar during the cutting operation necessitating that the machine must be stopped, the angularity of the torch repositioned, and the cutting operation thereafter again continued. Such an operation is highly impractical since it is extremely difficult to restart the torch and continue with a smooth accurate cut. Moreover, the interruption of the cutting operation to enable manual readjustment of the angularity of the torch causes a disturbance in the alignment of the pantograph mechanism causing inaccuracies in the outline of the workpiece.

Such a manual cutting operation wherein the machine is periodically stopped and the angularity of the torch is readjusted is totally impractical wherein the workpiece is of an irregular shape requiring substantially constant changing of the angular relationship between the torch and the supporting bar. For this reason the use of cutting machines of this general type has been restricted to simple cutting work, particularly work wherein the edges of the work pieces are perpendicular to their faces.

There has, accordingly, been a long-felt heretofore unfilled need for providing a pantograph-type cutting machine which is adapted to cut workpieces having a uniform taper along the periphery thereof such as required in the manufacture of dies, for example, having a substantially constant draft angle along the side edges thereof.

Accordingly, a primary object of the present invention is to provide a unique torch mounting assembly enabling uninterrupted accurate cutting operations of workpieces having a taper of a preselected angularity and which cutting operation cannot be achieved in cutting machines of similar type heretofore known.

Another object of the present invention is to provide a unique torch mounting assembly which enables accurate reproduction of workpieces having complex configurations and having a substantially uniform taper of a preselected angularity along the edges thereof.

Still another object of the present invention is to provide a cutting torch mounting assembly which provides for quick and simple adjustment of the angularity of the torch axis with respect to the plane of the workpiece over a wide range of angles thereby greatly enhancing the versatility, flexibility, and efficiency of cutting machines heretofore known.

A still further object of the present invention is to provide a pantograph-type cutting machine incorporating at least one torch mounting assembly thereon which enables preselected angular adjustment of the cutting torch and angular rotation thereof during the cutting operation in response to movement of a tracing device positioned in tracing relationship with a pattern or template of the workpiece being cut.

Yet still another object of the present invention is to provide a novel torch mounting assembly, the movement of which can be automatically and remotely controlled in response to the movement of a tracing device which is disposed in tracing relationship with a template or pattern of the workpiece being cut.

Still another object of the present invention is to provide a novel torch mounting assembly which is of simple design, durable and accurate operation, of quick and simple control and adjustment, and of economical manufacture.

The foregoing and other objects and advantages of the present invention are achieved by a cutting torch mounting assembly which is adapted to be mounted on a pantograph-type mechanism and which assembly comprises a rotatable member which is rotatable about an axis and including a hinged member thereon on which the cutting torch is mounted and pivotable thereby about a hinge axis whereby the inclination of the nozzle axis of the torch is adjustable and angularly disposed relative to the axis of rotation of the rotatable member and intersects that axis at a substantially constant point regardless of the rotating movement of the rotatable member enabling appropriate orientation of the nozzle axis relative to the direction of travel of the torch so as to cut a substantially uniform taper along the entire edge of a workpiece being cut.

Other objects and advantages of the present invention will become apparent from the following detailed description taken in conjunction with the accompanying drawings, wherein:

FIG. 3 is an enlarged fragmentary perspective view of the cutting torch mounting assembly shown in FIGURE 1 as viewed from the rearward side thereof;

FIG. 4 is a plan view of the cutting torch mounting assembly shown in FIGURE 1 and the terminal portion of the supporting frame on which it is mounted;

FIG. 5 is a perspective view of the forward portion of the cutting torch mounting assembly with portions broken away for clarity and portions in section illustrating the construction of the hinge assembly and torch mounting sleeve;

FIG. 6 is a vertical transverse sectional view taken through the turntable bearing substantially along the line 6—6 of FIG. 5;

FIG. 7 is a schematic geometric illustration of the angular pivoting movement of the nozzle axis of the cutting torch provided by the hinge mounting bracket, and FIG. 8 is a schematic geometrical view illustrating the relationship of the cutting torch to the edge of a right frusto conical workpiece being cut from a steel plate.

Figures 1, 2:
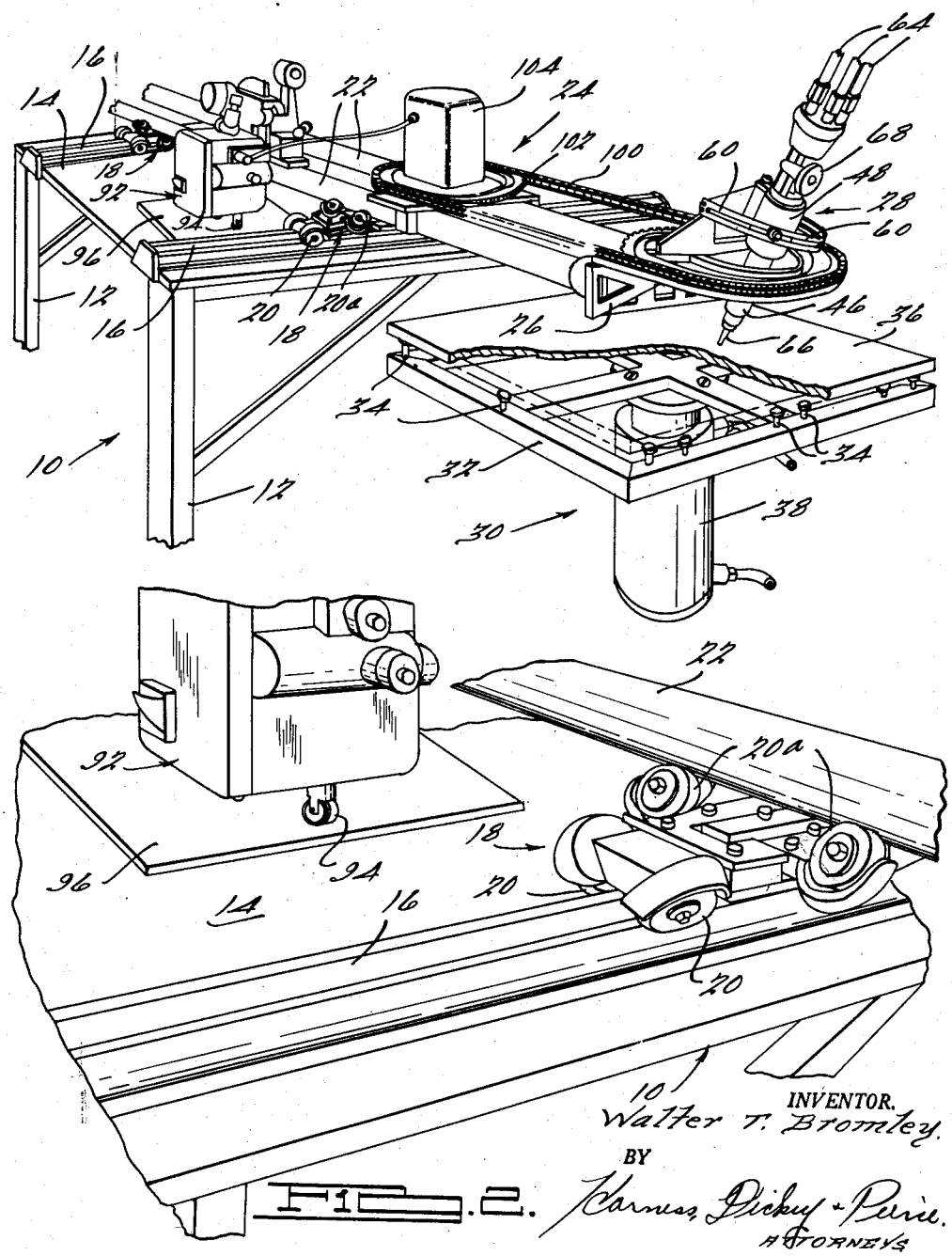
FIGURE 1 is a fragmentary perspective view partly in section of a typical cutting machine incorporating a torch mounting assembly constructed in accordance with the preferred embodiments of the present invention.
FIG. 2 is a fragmentary perspective view of the cutting machine shown in FIGURE 1 and illustrating particularly the relationship of a tracing device disposed above a tracing table and a compound carriage on which the supporting frame is movably mounted and movable responsive to the movement of the tracing device.

Referring now in detail to the drawings and as may be best seen in FIGURES 1 and 2, a typical cutting machine to which the present invention is applicable comprises a base frame 10 including a series of upright columns or legs 12, on which a horizontal platform or tracing table 14 is rigidly secured in a substantially horizontal position. Along each of the edges of the base frame 10 a pair of rails 16 are disposed in spaced substantially parallel relationship and lie in a substantially horizontal plane. Two compound carriages 18 are rotatably guided on each of the rails 16 by means of a series of anti-friction rollers 20 disposed in rolling bearing contact thereon. Each of the compound carriages 18 is provided with a second series of anti-friction rollers 20a rotatably mounted on the upper portion thereof, as may be best seen in FIG. 2 which are adapted to rotatably contact and guidably support a second pair of rails 22 disposed at substantially right angles to the rails 16 and comprising integral structural components of a movable supporting frame generally indicated at 24.

The overlying relationship between the rails 16 and the rails 22 separated by the intervening compound carriages 18 provides guided movement of the movable supporting frame 24 in any direction in a horizontal plane providing therewith a pantograph-type mechanism which can be employed for reproducing workpieces of any particular configuration in the same shape and size as a pattern or template of the workpiece mounted on the tracing table 14. Other suitable pantograph mechanisms can be employed such as a pair of horizontally pivotable pantograph arms to the ends of which a movable supporting frame is secured on which a suitable tracing device and one or more cutting torches are mounted for movement in unison in a path in accordance with the specific configuration of a workpiece being traced.

In the exemplary cutting machine shown in the drawing, the movable supporting frame 24 includes a rigid base member securely fastened to the end portions of the rails 22 on which a torch mounting assembly 28 comprising the present invention is rotatably mounted. In the exemplary machine shown in the drawings, only one torch mounting assembly 28 is shown. It will be appreciated that two or more torch mounting assemblies can be employed each of which moves in unison in response to movement of the movable supporting frame 24. The movable supporting frame 24 is counterbalanced such as by employing a corresponding number of torch assemblies or an equivalent weight on the other end portion of the supporting frame whereby extremely low forces are necessary to effect movement of the supporting frame through a course of travel corresponding to the shape of the article being traced.

The torch mounting assembly 28 is positioned above a cutting table 30 comprising a horizontal framework 32 having a plurality of upstanding lugs or pegs 34 on which a sheet material such as a steel plate 36 is firmly supported. The horizontal framework 32 of the cutting table 30 is vertically adjustable such as, for example, by a hydraulic jack assembly 38 forming the pedestal of the table in order that steel plates of varying thickness can be accommodated and appropriately positioned relative to the flame emitted from the cutting torch.

The torch mounting assembly 28 comprises a rotatable member or turntable 40 which is rotatably mounted on the base member 26 and rotatable about a substantially vertical axis disposed perpendicular to the plane of movement of the movable supporting frame 24. As may be best seen in FIG. 6, an antifriction bearing 42 is employed between the base member 26 and turntable 40 to minimize friction and maintain accurate horizontal stability of the turntable during horizontal movement and rotation thereof. The central portion of the turntable 40 is provided with a cutout portion 44 through which the shank end portion of a cutting torch 46 extends toward the surface of the steel plate 36 positioned on the cutting table 30. The cutting torch 46 as may be best seen in FIG. 5 is slidably mounted in a mounting sleeve 48 which is rigidly affixed to a hinge member 50 which is pivotally connected to a bracket 52 secured on the upper surface of turntable 40. The hinge member 50 is provided with a pair of longitudinally spaced lugs or ears 54 which are adapted to slidably overlie the end surfaces of a boss 56 projecting from the bracket 52 and are pivotally secured thereto by means of a pivot pin 58. The relative pivoting movement of the hinge member 50 and sleeve 48 thereon with respect to the bracket 52 is restricted by means of an arcuate slotted strap 60 affixed to the opposing sides of a bracket 52 through which the shank portion of a clamping screw 62 extends and is threadably engaged in the sleeve 48 for adjustably clamping the sleeve relative to the bracket. In accordance with this arrangement, the torch 46 can be adjustably positioned along an arcuate displacement of about 180° whereby the inclination thereof relative to the steel plate 36 can be adjusted to the desired angularity as will be subsequently described in greater detail.

The cutting torch 46 mounted in the sleeve 48 is of the conventional type employed for cutting metals and is provided at the upper portion thereof with a series of flexible tubes 64 for supplying combustible gases such as acetylene, propane, natural gas, and the like, in addition to oxygen for achieving the desired cutting flame temperature. The lower end portion of the cutting torch 46 is provided with a removable cutting tip or nozzle 66 which can be readily interchanged to achieve the desired flame configuration for any specific cutting operation. In the specific cutting torch shown, the axis of the nozzle 66 is disposed in substantial axial alignment with the sleeve 48 whereby axial movement of the torch relative to the sleeve 48 provides for appropriate adjustment of the end of the nozzle 66 relative to the steel plate being cut. Axial adjustment of the torch relative to the sleeve 48 is achieved, for example, by a rack and pinion arrangement 67 as may be best seen in FIG. 5 which by manual rotation of an adjusting knob 68 provides for appropriate axial adjustment of the nozzle 66 with respect to the sheet being cut.

The relative geometry of the torch mounting assembly 28 may be best described with reference to the schematic geometric drawing shown in FIG. 7 in which the axis of rotation of the turntable 40 is indicated at 70 which is disposed substantially perpendicular to a horizontal plane 72 which corresponds to the plane of movement of the movable supporting frame. A plane 74 corresponding to the plane of the surface of the steel plate being cut is disposed substantially parallel to the plane 72 and perpendicular to the axis 70. The axis about which the hinge member 50 and sleeve 48 thereon pivot, is generally indicated at 76 which also corresponds to the axis of the pivot pin 58 for pivotally securing the hinge member and the bracket 52 together. The hinge axis 76 as shown in FIG. 7 is disposed in a plane 78 which is common to the axis 70 and is perpendicular to the planes 72 and 74. The hinge axis 76 intersects the axis 70 about which the turntable rotates at an acute angle and at a point coinciding substantially with a point on the surface of the plane 74 which is indicated at 80.

By virtue of the pivoting movement of the torch about the pivot pin 58, the axis through the sleeve 48 which also corresponds to the axis of the nozzle is pivotable through an arcuate displacement of about 180° and through an arcuate path of travel indicated by a double ended arrow 82. A typical position of a nozzle axis 84 is indicated in FIG. 7 at an intermediate position along the double ended arrow 82. The nozzle axis 84 is oriented to intersect the axis 70 at a point 80 coinciding substantially with the point at which the hinge axis 76 and axis 70 intersect the surface of the work. By positioning the sleeve 48 so that the angle of inclination of the nozzle axis 84 with respect to the hinge axis 76 corresponds to the angularity between the axes 70 and 76, the nozzle axis can be positioned at a so-called closed position of the hinge member 50 indicated at C wherein the nozzle axis 84 coincides with the axis 70 and in which position the nozzle axis is disposed perpendicular to the surface of the steel plate being cut. Accordingly, in the closed position the cutting action of the nozzle corresponds to the vertical cutting position of torches employed in machines of similar type heretofore known. When the nozzle axis is disposed in a so-called open position indicated at O, maximum angularity between the nozzle axis and plane 80 is obtained.

When a workpiece having a substantially uniform taper along the edges thereof is to be cut, the nozzle axis 84 is swung along the double ended arrow 82 by virtue of the pivot connection until the appropriate angularity is attained. For example, with an acute angle of 30° corresponding to the angularity between the axes 70 and 76 and the axes 76 and 84, tilt angles of the nozzle axis can be achieved ranging from 0° corresponding to the closed position to 60° corresponding to the open position. It will be understood that the acute angle between the hinge axis 76 and the nozzle axis 84 can be constructed to achieve any desired angularity in order to provide the desired range of tilting angles of the nozzle axis in order to enable the cutting of the desired range of tapers of workpieces from the steel plate. While it is not necessary for the satisfactory operation of the torch mounting assembly, it is preferred that the angularity between the hinge axis and nozzle axis corresponds substantially to the angularity between the hinge axis and axis 70 about which the turntable rotates in order that the torch and the nozzle thereon can be placed in a vertical position when in the closed position to enable cutting workpieces having perpendicular edges. It will also be noted from the schematic geometrical drawing shown in FIG. 7, that regardless of the angularity in which the nozzle axis is disposed, it always intersects the plane of the workpiece 74 at the point 80. In addition, in view of the fact that the nozzle axis intersects the axis 70 about which the turntable rotates at the point 80, the plane 72 can be rotated about the axis 70 to any desired angle and in each position the nozzle axis will intersect the axis 70 at a point corresponding to the point 80 so that the cutting flame emitted from the nozzle will strike the work at that point.

In accordance with the foregoing description of the geometry of the torch mounting assembly, it will be apparent that when cutting a uniform taper along the edge of a workpiece it is only necessary to preset the nozzle axis to the desired angularity and thereafter position the plane in which the axis of rotation of the turntable and the nozzle axis is perpendicular to the edge of the workpiece being cut or perpendicular to a line tangent to the edge in the event the edge is of an arcuate configuration. This relationship is shown in FIG. 8 wherein the position of a plane 86 in which the nozzle axis 84 and the axis 70 lies is disposed substantially perpendicular to a tangent line 88 of a circle during the cutting of a right frusto conical workpiece 90. It will be appreciated that as the torch axis moves around the circular edge of the workpiece 90 during the cutting operation, the plane 86 is continually rotated so as to remain perpendicular to the edge which is achieved by a controlled rotation of the turntable 40 of the torch mounting assembly.

The controlled rotation of the turntable 40 so as to maintain the plane 86 as shown in FIG. 8 perpendicular to the edge of the workpiece being cut providing therewith a uniform taper along the entire edge thereof, can be achieved in a number of ways including mechanical devices coordinated with the tracing device or by electromechanical mechanisms which will subsequently be described.

In the exemplary cutting machine shown in the drawings, the guided rotation of the turntable is achieved in response to the guided travel of the movable supporting frame in response to an electronic tracing device 92 as may be best seen in FIGS. 1 and 2. Electronic tracing devices of the general type employed are well known in the art and conventionally employ an optical system including a scanning head which is operative to guide a traction wheel or drive wheel 94 along a line corresponding to the outline of the part to be cut which is drawn on a template 96 disposed on the tracing table 14. The tracing device 92 is supported on the frame work of the movable supporting frame 24 and is effective to transmit and guidably move the entire movable supporting frame in response to the driving reaction of the traction wheel 94 on the template 96. In conventional electronic tracing devices employing an optical scanning head for following the outline of the template, the traction wheel 94 is mounted on a suitable steering shaft (not shown) which is connected to a steering motor which rotates the steering shaft in response to impulses received from the scanning head. Rotation of the traction wheel is achieved by a suitable drive motor (not shown) drivingly connected to the traction wheel.

Alternate type tracing units such as magnetic tracing heads and manual tracing heads, for example, can also be satisfactorily employed. In the case of a manual tracing head, a follower wheel similar to the traction wheel 94 is employed which is manually guided along the outline of the template to effect guided movement of the movable supporting frame 24 in the appropriate direction and at the proper cutting speed. In either case, the rotation of the steering shaft on which the traction wheel or follower wheel is disposed, can be employed to indicate the direction of travel of the movable supporting frame and cutting torch mounting assemblies thereon in order to enable appropriate orientation of the turntable so as to dispose the nozzle axis of the torch substantially at right angles to the direction of travel of the movable supporting frame.

In the exemplary cutting machine shown in the drawings, remote rotation of the turntable 40 is achieved by a chain and sprocket arrangement wherein the turntable 40 is provided with a series of sprocket teeth 98 along the outer edge thereof and around which a chain 100 is engageably trained. The chain 100 extends around a drive sprocket 102 (FIG. 1) rotatably mounted on the movable supporting frame which on rotation thereof is effective to cause a corresponding angular rotation of the turntable 40. Selected rotation of the drive sprocket 102 can be achieved either manually, mechanically, or electrically in response to variations in the direction of movement of the movable supporting frame as guided by the tracing device. In a manual operation, for example, the orientation of the steering shaft of the traction wheel 94 of the electronic tracing device 92 can be indicated by a suitable dial mounted on the housing of the tracing device which can be read by one operator and communicated to a second operator manipulating the drive sprocket 102. The drive sprocket 102 in such a case, is provided with suitable indicia corresponding to the indicia of the dial on the tracing device whereby the turntable 40 can be rotated so as to maintain the axis of the nozzle torch substantially perpendicular to the edge of the workpiece being cut.

Alternatively, the steering shaft of the tracing device can be coupled to a flexible torsion cable which extends to the drive sprocket 102 whereby rotation of the steering shaft of the tracing device is accompanied by a corresponding rotation of the drive sprocket and the turntable 40. Controlled rotational guidance of the turntable in response to rotation of the steering shaft of the tracing device can also be achieved by a selsyn-type system or a servo-system of the type including a motor coupled to the drive sprocket 102 and an amplifier causing rotation thereof through an angularity corresponding to the angular rotation of the steering shaft as sensed by a rotational position responsive sensing means of the types well known in the art.

In a selsyn-type system, for example, which is in widespread use for transferring a mechanical displacement to some distant point electrically and is also frequently called synchros and autosyns, one segment of the selsyn system can be mounted directly on the drive sprocket 102 in a housing 104 as shown in FIGURE 1, which is operated to rotate the drive sprocket in accordance with impulses received from the other segment of the selsyn system actuable responsive to rotation of the traction wheel steering shaft.

Regardless of the specific tracing device and coordinating device for guiding the movable supporting frame and rotating the turntable, the unique torch mounting assembly comprising the present invention enables a simple, quick, and accurate duplication of workpieces having a substantially uniform draft angle of the desired inclination along their entire side edge surfaces. It will be understood that when the angularity of the torch is adjusted by pivoting the mounting sleeve 48 about the pivot pin 58, an appropriate correction must be made with respect to the orientation of the plane through the nozzle axis which is guided to be disposed perpendicular to the edge of the article being traced with respect to the position of the steering shaft in order to assure that the plane of the nozzle axis is disposed perpendicular to the direction of travel of the traction wheel. It will also be appreciated by those skilled in the art that in cutting machines employing two or more torch mounting assemblies of the type herein shown and described, each of the turntables thereof are suitably coupled to the drive sprocket 102 or other suitable drive means for causing the turntables to selectively rotate in unison in accordance with the configuration of the workpiece being traced. It will also be understood that when the nozzle axis is disposed in a substantially vertical position or perpendicular to the plane of the sheet being cut in such instances where no taper is desired, no guided rotation of the turntable is necessary.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A cutting torch mounting assembly comprising a rotatable member rotatable about a first axis, a hinge member comprising a first member secured to said rotatable member and a second member pivotally connected thereto and pivotable about a hinge axis that intersects said first axis at an acute angle, mounting means on said second member for mounting a torch thereon with the nozzle axis thereof intersecting said hinge axis at an acute angle and at a point coinciding substantially to the point of intersection of said hinge axis and said first axis, and retaining means for adjustably restraining the pivoting movement of said second member relative to said first member.

2. A cutting torch mounting assembly comprising a rotatable member rotatable about a first axis, a hinge member comprising a first member affixed to said rotatable member and a second member pivotally connected thereto and pivotable about a hinge axis that intersects said first axis at an acute angle, mounting means on said second member for mounting a torch thereon with the nozzle axis thereof intersecting said hinge axis at the same angularity as said acute angle and at a point coinciding substantially to the point of intersection of said hinge axis and said first axis, and retaining means for adjustably restraining the pivoting movement of said second member relative to said first member.

3. A cutting torch mounting assembly comprising a rotatable member rotatable about a first axis, a hinge member comprising a first member affixed to said rotatable member and a second member pivotally connected to said first member and pivotable about a hinge axis that intersects said first axis at an acute angle, mounting means on said second member for mounting a torch with the nozzle axis thereof intersecting said hinge axis at the same angularity as said acute angle and at a point coinciding substantially to the point of intersection of said hinge axis and said first axis, said second member pivotable about said hinge axis to and from a first position wherein said nozzle axis coincides with said first axis and a second position arcuately displaced from said first position wherein said nozzle axis intersects said first axis at an angle, and retaining means for adjustably restraining the pivoting movement of said second member relative to said first member.

4. A cutting torch mounting assembly comprising a base, a turntable rotatably mounted on said base and rotatable about a first axis, a hinge member comprising a first member affixed to said turntable and a second member pivotally connected to said first member and pivotable about a hinge axis that intersects said first axis at an acute angle, mounting means on said second member for mounting a torch with the nozzle axis thereof intersecting said hinge axis at an acute angle and at a point coinciding substantially to the point of intersection of said hinge axis and said first axis, retaining means for adjustably restraining the pivoting movement of said second member relative to said first member, and means for rotating said turntable.

5. A cutting torch mounting assembly comprising a base, a turntable rotatably mounted on said base and rotatable about a first axis, a hinge member comprsing a first member affixed to said turntable and a second member pivotally connected to said first member and pivotable about a hinge axis that intersects said first axis at an acute angle, mounting means including a sleeve on said second member for mounting a torch with the nozzle axis thereof intersecting said hinge axis at the same angularity as said acute angle and at a point coinciding substantially to the point of intersection of said hinge axis and said first axis, rack and pinion means on said sleeve and said torch for adjustably moving said torch axially along said nozzle axis, said second member pivotable about said hinge axis to and from a first position wherein said nozzle axis coincides with said first axis and a second position arcuately spaced therefrom wherein said nozzle axis intersects said first axis at an angle, retaining means for adjustably restraining the pivoting movement of said second member relative to said first member, and means for selectively rotating said turntable relative to said base.

6. In a cutting machine, the combination comprising a pantograph mechanism including a first supporting member and a second supporting member movable in unison in a plane in response to movement of the other, tracing means on said first supporting member for tracing the configuration of an object, a torch mounting assembly on said second supporting member, said mounting assembly comprising a rotatable member rotatable about a first axis perpendicular to said plane, a hinge member comprising a first member affixed to said rotatable member and a second member pivotally connected to said first member and pivotable about a hinge axis that intersects said first axis at an acute angle, mounting means on said second member for mounting a torch with the nozzle axis thereof intersecting said hinge axis at an acute angle and at a point coinciding substantially to the point of intersection of said hinge axis and of said first axis, retaining means for adjustably restraining the pivoting movement of said second member relative to said first member, means for moving said first and said second supporting members through a path of travel corresponding to the configuration of the object being traced, and means for rotating said rotatable members to maintain a plane in which said nozzle axis and said first axis lie substantially perpendicular to the direction of travel of said second supporting member.

7. In a cutting machine the combination comprising a pantograph mechanism including a supporting member movable in a horizontal plane, tracing means on one portion of said supporting member for tracing the configuration of an object to be cut, at least one torch mounting assembly on another portion of said supporting member and fixedly disposed relative to said tracing means, said mounting assembly comprising a turntable rotatably mounted on said supporting member and rotatable about a vertical axis, a hinge member comprising a first member affixed to said turntable and a second member pivotally connected to said first member and pivotable about a hinge axis that intersects said vertical axis at an acute angle, mounting means including a sleeve on said second member for mounting a torch with the nozzle axis thereof intersecting said hinge axis at the same angularity as said acute angle and at a point coinciding substantially to the point of intersection of said hinge axis and said vertical axis, adjusting means on said sleeve for adjustably moving said torch axially along said nozzle axis, said second member pivotable about said hinge axis to and from a first position wherein said nozzle axis coincide with said vertical axis and a second position arcuately displaced therefrom wherein said nozzle axis intersects said first axis at an angle, and retaining means for adjustably restraining the pivoting movement of said second member relative to said first member, drive means on said supporting member drivingly connected to said turntable for causing selective rotation thereof about said vertical axis, control means for controlling said drive means so as to rotate said turntable to maintain a vertical plane in which said nozzle axis lies substantially perpendicular to the direction of travel of said supporting member, and means for moving said supporting member in a path of travel corresponding to the configuration of an object being traced.

References Cited in the file of this patent

UNITED STATES PATENTS

| | | |
|---|---|---|
| 2,087,678 | Wagner | July 20, 1937 |
| 2,508,468 | Rathje | May 23, 1950 |
| 2,851,264 | Bryant | Sept. 9, 1958 |